(12) United States Patent
Imle (10) Patent No.: US 11,000,947 B2
(45) Date of Patent: May 11, 2021

(54) COATING PLANT ROBOT, IN PARTICULAR MANIPULATING ROBOT

(71) Applicant: Dürr Systems AG, Bietigheim-Bissingen (DE)

(72) Inventor: Matthias Imle, Pleidelsheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 79 days.

(21) Appl. No.: 15/742,554

(22) PCT Filed: Jul. 5, 2016

(86) PCT No.: PCT/EP2016/001147
§ 371 (c)(1),
(2) Date: Jan. 8, 2018

(87) PCT Pub. No.: WO2017/008889
PCT Pub. Date: Jan. 19, 2017

(65) Prior Publication Data
US 2018/0200879 A1    Jul. 19, 2018

(30) Foreign Application Priority Data

Jul. 14, 2015    (DE) .......................... 102015009163.8

(51) Int. Cl.
*B25J 9/04*    (2006.01)
*B25J 9/00*    (2006.01)
(Continued)

(52) U.S. Cl.
CPC .......... *B25J 9/0072* (2013.01); *B25J 9/0045* (2013.01); *B25J 9/04* (2013.01); *B25J 9/1065* (2013.01); *B25J 11/0075* (2013.01)

(58) Field of Classification Search
CPC ...... B25J 9/0072; B25J 9/0045; B25J 9/1065; B25J 11/0075; B25J 9/126; B25J 9/003; B25J 9/0036
(Continued)

(56) References Cited

U.S. PATENT DOCUMENTS 4,342,536 A    8/1982  Akeel et al.
5,423,648 A *  6/1995  Akeel .................... B21D 43/05
                                                 198/468.2
(Continued)

FOREIGN PATENT DOCUMENTS

DE    102005033972 A1    1/2007
DE    102011121343 A1    6/2013
(Continued)

OTHER PUBLICATIONS

20821151 Fender—New OEM Part From GM Parts Direct_GM Parts Store (relevant to corroborate the shape and form of a front fender quarter panel). (Year: 2014).*
(Continued)

*Primary Examiner* — Randell J Krug
(74) *Attorney, Agent, or Firm* — Bejin Bieneman PLC (57) ABSTRACT

The disclosure relates to a coating plant robot (1), in particular as a manipulating robot (1) for opening or closing a motor vehicle bodywork during a painting process, comprising a robot kinematic system (6-15) for moving an
(Continued)

effector (14) in the space. The disclosure provides that the robot kinematic system (6-15) has a first robot arm (8) with a parallel kinematic system.

17 Claims, 6 Drawing Sheets

(51) Int. Cl.
  *B25J 9/10* (2006.01)
  *B25J 11/00* (2006.01)
(58) Field of Classification Search
  USPC .......................................... 74/490.03, 490.05
  See application file for complete search history.

(56) References Cited

U.S. PATENT DOCUMENTS

| | | | |
|---|---|---|---|
| 5,467,813 A * | 11/1995 | Vermaat | B25J 5/00 165/11.2 |
| 8,397,662 B2 * | 3/2013 | Herre | B25J 9/0093 118/300 |
| 8,846,155 B2 | 9/2014 | Herre et al. | |
| 9,573,153 B2 * | 2/2017 | Heuschen | B05B 13/005 |
| 2016/0039093 A1 * | 2/2016 | Abdallah | B25J 9/1687 700/257 |
| 2016/0236359 A1 * | 8/2016 | Song | B25J 9/1065 |

FOREIGN PATENT DOCUMENTS

| | | |
|---|---|---|
| DE | 102013002412 A1 | 8/2014 |
| EP | 1614480 A1 | 1/2006 |
| EP | 2497576 A1 | 9/2012 |
| GB | 2516545 A | 1/2015 |
| JP | 2000354986 A | 12/2000 |
| JP | 2003089090 A | 3/2003 |
| JP | 2011098298 A | 5/2011 |
| JP | 2013031890 A | 2/2013 |
| JP | 2015530239 A | 10/2015 |
| KR | 20140012481 A | 2/2014 |
| WO | 2014037562 A1 | 3/2014 |

OTHER PUBLICATIONS

GE Fanuc Automation Solutions for the Automotive Industry (Year: 2005).*
International Search Report and Written Opinion for PCT/EP2016/001147 dated Oct. 21, 2016 (11 pages; with translation).
Japanese Office Action for JP2018-501861 dated Jan. 7, 2020 (25 pages; with English translation).

* cited by examiner

COATING PLANT ROBOT, IN PARTICULAR MANIPULATING ROBOT

CROSS-REFERENCE TO RELATED APPLICATIONS

This application is a national stage of, and claims priority to, Patent Cooperation Treaty Application No. PCT/EP2016/001147, filed on Jul. 5, 2016, which application claims priority to German Application No. DE 10 2015 009 163.8, filed on Jul. 14, 2015, which applications are hereby incorporated herein by reference in their entireties.

BACKGROUND

The disclosure relates to a coating plant robot, in particular as a manipulating robot for opening or closing a motor vehicle bodywork during a painting process.

In modern painting plants for painting motor vehicle bodywork units, the doors and hoods (trunk hood and engine hood) are opened during the painting process in order to be able to undertake an interior painting in the interior of the motor vehicle bodywork. Subsequently, the doors and hoods must then be closed again. For this purpose, manipulating robots are usually employed which are typically configured as SCARA robots (SCARA: Selective Compliance Assembly Robot Arm) and have exclusively parallel or perpendicularly oriented rotation axes. These SCARA robots typically have a gripper for opening the doors of the motor vehicle bodywork.

A disadvantage with such SCARA robots is the relatively low mechanical stiffness which can become a problem both with a static loading as well as with a dynamic loading.

A further disadvantage of the known SCARA robots is the limited reach. This problem can be solved with an additional linear travel axis on which the SCARA robot is displaceably mounted. However, such a linear travel axis is susceptible to dirt and is associated with additional investment and maintenance costs. Another solution to the problem of the limited reach lies in providing additional joints and robot elements, by means of which the reach of the SCARA robot can be increased. A disadvantage of this solution, however, is the fact that the SCARA robot forms a relatively large interference profile, even in the folded-together state, and the interference profile represents a hindrance for other robots and for a downwardly directed airflow in the paint booth.

Reference is also made, with regard to the prior art, to EP 1 614 480 A1 and DE 10 2005 033 972 A1. These documents disclose an application robot with a robot kinematic system which combines a serial kinematic system with a parallel kinematic system. However, these known robots do not involve a manipulating robot, but a painting robot. Furthermore, the parallel kinematic system is herein proximally arranged and is mounted on a ceiling or a wall of a paint booth. The parallel kinematic system therefore does not represent a robot arm in the proper sense.

Furthermore, reference is made with regard to the general technological background of the disclosure, to GB 2 516 545 A, DE 10 2011 121 343 A1, U.S. Pat. No. 5,423,648, JP 2003 089 090 A and U.S. Pat. No. 4,342,536.

DETAILED DESCRIPTION

The instant disclosure relates to a robotic kinematic system with an effector. The effector can be, for example, a manipulating tool (e.g. gripper) of a manipulating robot. However, alternatively, there also exists the possibility that the effector is an application device of an application robot. The application device can be, for example, a rotary atomiser (e.g. a bell atomiser, a disk atomiser), an air atomiser, an airmix atomiser, an airless atomiser, an ultrasonic atomiser or a stripe applicator (e.g. according to DE 10 2013 002 412 A1) wherein these types of application devices are per se known from the prior art and therefore need not be described in detail.

The expression used in the context of the disclosure of a coating plant robot therefore includes all robot types which are used in a coating plant, such as manipulating robots (e.g. door openers, hood openers), application robots (e.g. painting robots, gluing robots).

The disclosed robot kinematics has at least one robot arm. The disclosure includes at least one robot arm of the robot kinematics that has a parallel kinematic system. Herein, the disclosure is also distinguished from the prior art according to EP 1 614 480 A1. This document also discloses a robot kinematics which combines a serial kinematic system with a parallel kinematic system. However, in this prior art, the parallel kinematic system is arranged proximally and is mounted positionally fixed on a ceiling or a wall of a paint booth and thus does not form a robot arm within the context of the disclosure.

In an example, the robot arm with the parallel kinematic system comprises at least two arm parts, each having two rotation joints, so that the robot arm with the parallel kinematic system forms a quadrilateral of joints with the parallel kinematic system, whereby the arm parts are each rotatable relative to directly adjacent robot elements. The rotation joints are herein may be each arranged at the ends of the individual arm parts. It should also be mentioned that the rotation joints of one arm part have different rotation axes from the rotation joints of the other arm part. Thereby, the disclosure differs from conventional industrial robots with parallel arm parts that have common rotation axes at their respective ends. It should further be mentioned that the rotation axes of the two arm parts preferably all extend parallel to one another. The parallel kinematic system of the robot arms preferably has only one rotary drive in order to pivot the arm parts of the robot arm relative to a directly adjacent robot element. Thereby, the disclosed parallel kinematic system differs, for example, from conventional parallel kinematic systems as are known, for example, from EP 1 614 480 A1, since parallel kinematic system typically have no rotary drive, but rather linear drives, which act upon the effector.

In an example, the rotation axes of the four rotation joints of the two arm parts form a parallelogram, i.e. a planar quadrilateral in which the edges opposing one another are mutually parallel in respective pairs. This means that a pivoting of the parallel kinematic system leads only to a change in the spatial position of the kinematically following robot element, whereas the spatial orientation (angular position) of the kinematically following robot element is not influenced by the pivot movement of the parallel kinematic system.

Alternatively however, the possibility also exists that the four rotation joints of the two arm parts form a trapezium, i.e. a quadrilateral with two parallel opposing sides and two non-parallel opposing sides. The two arm parts herein preferably form the opposing parallel sides of the trapeze.

In the example, the robot arm is arranged with the parallel kinematic system kinematically immediately between two adjacent robot elements, wherein the robot arm of the parallel kinematic system is pivotable relative to the two directly adjacent robot elements. Herein, the parallel kinematic system enables the directly adjacent robot elements to be held at a constant angular relationship to one another during a pivot movement of the parallel kinematic system.

The robot kinematics may comprise not only one robot arm with a parallel kinematic system, but rather two robot arms with a parallel kinematic system, wherein the two robot arms with the parallel kinematic system are arranged kinematically serially behind one another. Herein, the two robot arms with the parallel kinematic system can be arranged kinematically directly behind one another. Preferably, however, further robot elements are arranged kinematically serially between the two robot arms with a parallel kinematic system. In the preferred exemplary embodiment, however, the rotation joints of the two robot arms with the parallel kinematic system are normally oriented with their rotation axes substantially horizontally, independently of the position of the coating plant robot.

In the example, the robot kinematics has a proximally arranged first robot element, a second robot element pivotable relative thereto, the first robot arm with the parallel kinematic system, a third robot element, a fourth robot element pivotable relative to the third robot element, the second robot arm with the parallel kinematic system, a fifth robot element and a sixth robot element which is pivotable relative to the fifth robot element.

In the example, the pivotable second robot element is arranged beneath the first robot element and is pivotable about a first pivot axis. The first robot arm with the parallel kinematic system, however, is pivotable relative to the second robot element about a preferably horizontal second axis. The fourth robot element, however, is pivotable relative to the third robot element about a preferably vertical third pivot axis.

Furthermore, the second robot arm with the parallel kinematic system is pivotable relative to the fourth robot element about a preferably horizontal fourth pivot axis. Finally, the sixth robot element is pivotable relative to the fifth robot element about a preferably vertical fifth pivot axis.

It should also be mentioned that the proximal first robot element may be arranged positionally fixed so that an additional linear travel rail can be dispensed with. This is advantageous since thereby the investment and maintenance costs of the coating plant robot are lower and also since no dirtying of the linear travel axis can occur. However, it is alternatively also possible in the context of the disclosure that the proximal first robot element is movable on a travel rail.

In the example, the coating plant robot is a manipulating robot and the effector is a manipulating tool, in particular a gripper or a hook, which is configured to open or close a motor vehicle bodywork in the context of a painting process.

For example, the manipulating robot can be a door opener which is configured to open or close a door of a motor vehicle bodywork in the context of a painting process.

However, the manipulating robot can also be a hood opener which is configured to open or close a hood (e.g. engine hood, trunk hood) of a motor vehicle bodywork in the context of a painting process.

The disclosed manipulating robot may be arranged positionally fixed and nevertheless has a sufficiently large working space in order to open all the doors on one side of a motor vehicle bodywork and possibly also the trunk hood and the engine hood of the motor vehicle bodywork. The extension of the working space of the manipulating robot required for this as compared with conventional SCARA robots is enabled by means of the disclosed robot kinematics.

It should also be noted that the coating plant robot has a maximum permissible load capacity of at least 1 kg, 2 kg, 5 kg, 10 kg, 20 kg or even at least 50 kg. Thereby, the disclosed coating plant robot is also differentiated from other robots in other technical fields, for example, the medical field where substantially smaller load capacities are required.

It is also noteworthy that the coating plant robot has a relatively large operating range, which extends in the horizontal and vertical directions, over a width, height and/or length of at least 1 m, 2 m, 4 m or 6 m. The length of the operating range is herein measured in a painting plant along the conveying direction of the painting line, whereas the width of the operating range is measured transversely to the conveying direction of the painting line.

It is further noteworthy that the coating plant robot may comprise at least two, three, four or even at least five movable robot axes. However, the disclosed coating plant robot should not have too many robot axes, since the stiffness of the robot kinematics is worsened thereby. The disclosed coating plant robot therefore preferably has at most seven, six or at most five movable robot axes. In the example, the coating plant robot therefore has five movable axes.

The driving of the disclosed coating plant robot takes place preferably by means of an electric axis drive, for example, by means of a three-phase synchronous motor. However, the disclosed is not restricted, with regard to the mechanical drive of the coating plant robot, to this example.

Furthermore, it is noteworthy that, in the disclosed coating plant robot, the robot kinematics is preferably combined serial and parallel.

The concept of a robot as used in the context of the disclosure preferably implies that the robot is freely programmable, as also accords with the standardized definition of a robot.

It should further be mentioned that the robot kinematics may be configured so that, on a robot movement, the effector (e.g. gripping tool) is held in a constant spatial orientation (angular position) to the vertical, as is also the case in a conventional SCARA robot.

In the example, both arm parts of the parallel kinematic system are pivotably mounted on the same side of the respectively directly adjacent robot elements. However, the possibility also exists that the parallel kinematic system has four arm parts wherein two of the arm parts are pivotably mounted on one side of the adjoining robot elements, whilst the two other arm parts are mounted on the opposing side of the adjoining robot elements.

In the example, the coating plant robot is arranged at least partially in a paint booth, wherein in the paint booth, a downwardly directed airstream is generated in order to carry away excess coating agent mist ("overspray") as rapidly as possible downwardly out of the paint booth, for example, through a cabin floor constructed as a grating. The downwardly directed airstream is typically generated by means of a so-called filter ceiling of the paint booth, which is per se known from the prior art and therefore need not be described in detail. The coating plant robot is herein preferably foldable together in order, in the folded-together state, to present to the downwardly directed airstream in the paint booth the smallest possible interference profile. The disclosed robot kinematics advantageously enables a minimization of the interference area of the coating plant robot, which can thus have an interference profile in the horizontal direction of less than 2 m$^2$, 1 m$^2$, 0.5 m$^2$, 0.25 m$^2$ or even less than 0.1 m$^2$. It is herein noteworthy that the interference profile of the coating plant robot in the folded-together state preferably extends in the longitudinal direction of the paint booth over a length of less than 2 m, 1.5 m, 1 m or even less than 75 cm. Transversely to the longitudinal direction of the paint booth, however, the interference profile of the coating plant robot in the folded-together state preferably extends over a width of less than 1 m, 75 cm or even less than 50 cm.

The figures show a manipulating robot 1 that can be used in a painting plant for painting motor vehicle bodywork 2 (FIG. 4) in order to open doors 3, engine hood 4 and trunk hood 5 of the motor vehicle bodywork 2 in the context of a painting process, so that the interior of the motor vehicle bodywork 2 can be painted.

The manipulating robot 1 has a first robot element 6 which is arranged kinematically proximal. The robot element 6 is arranged positionally fixed, so that an additional travel rail can be dispensed with. Dispensing with a linear travel rail is advantageous since thereby the investment and maintenance costs are lower and since through dispensing with the travel axis, no dirt problems with the travel axis can arise.

Arranged beneath the proximal robot element 6 is a second robot element 7, wherein the second robot element 7 is rotatable relative to the first robot element 6 about a vertical pivot axis A1.

Figure 5A:
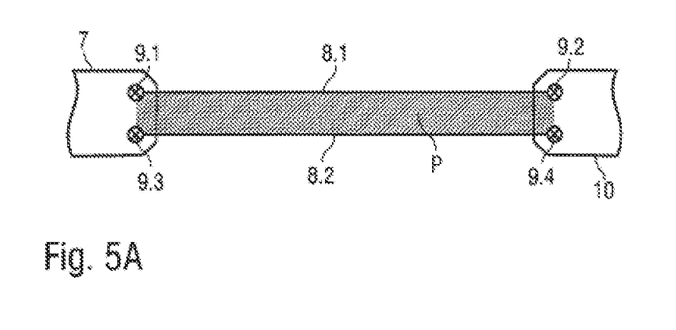
FIGS. 5A and 5B show schematic representations of the disclosed parallel kinematic system in the form of a parallelogram.
Figure 5B:
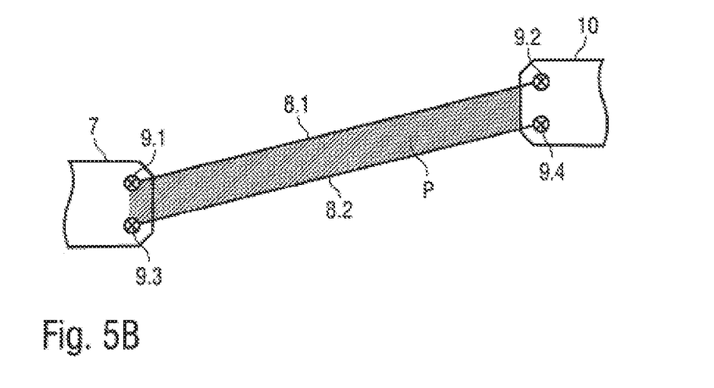

A robot arm 8 is pivotably mounted on the robot element 7, the robot arm 8 having a parallel kinematic system. The parallel kinematic system of the robot arm 8 consists substantially of two arm parts 8.1, 8.2 which are arranged kinematically parallel and adjoining one another. The two arm parts 8.1, 8.2 have at their respective ends a rotation joint (FIGS. 5A, 5B), wherein the rotation joints of the two arm parts 8.1, 8.2 have four rotation axes 9.1-9.4 which are different. The rotation axes 9.1, 9.2 of the arm part 8.1 are thus differently located from the rotation axes 9.3, 9.4 of the other arm part 8.2. This means that the rotation joints of the two arm parts 8.1, 8.2 define a quadrilateral of joints which, in this example, has the form of a parallelogram P, as shown in FIGS. 5A and 5B.

Mounted kinematically behind the robot arm 8 with the parallel kinematic system is a further robot element 10, wherein a pivoting of the robot arm 8 has the consequence that the robot element 10 changes its position in the space, although the spatial orientation (angular position to the vertical) of the robot element 10 remains unchanged. The robot arm 8 is thus pivotable relative to the robot element 7 about a pivot axis A2, wherein the pivoting process leads to a lateral displacement and to a raising or lowering of the robot element 10.

Furthermore, the manipulating robot 1 has a further robot element 11 which is rotatable relative to the robot element 10 about a vertical pivot axis A3.

A further robot arm 12 with a parallel kinematic system is pivotably mounted on the robot element 11 wherein the robot arm 12 again has two arm parts 12.1, 12.2. Otherwise, the robot arm 12 corresponds substantially to the robot arm 8, so that, for the avoidance of repetition, reference is made to the above description. Pivoting of the robot arm 12 about a pivot axis A4 leads to a lateral displacement and to a raising or lowering of a further robot element 13 connected to the robot arm 12.

Figure 1:
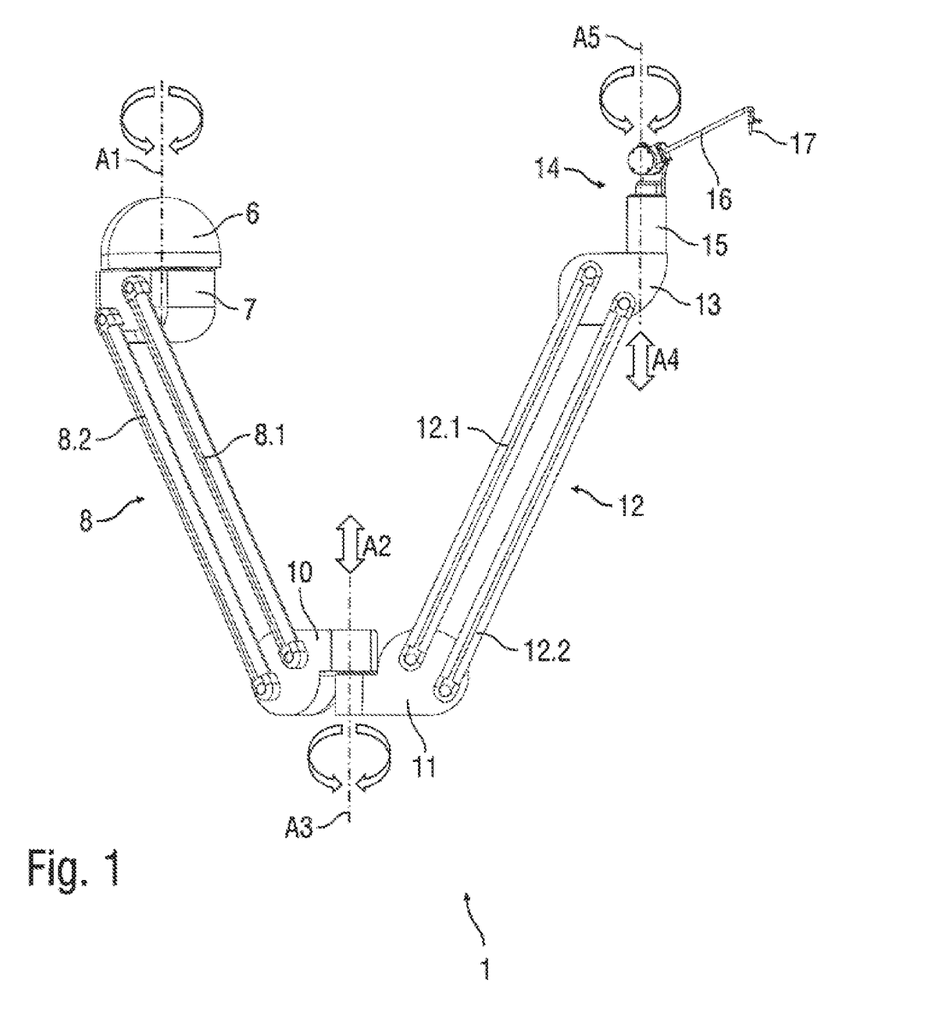
FIG. 1 shows a perspective view of a disclosed manipulating robot for opening doors and hoods of a motor vehicle bodywork during a painting process in a painting plant.
Figure 2:
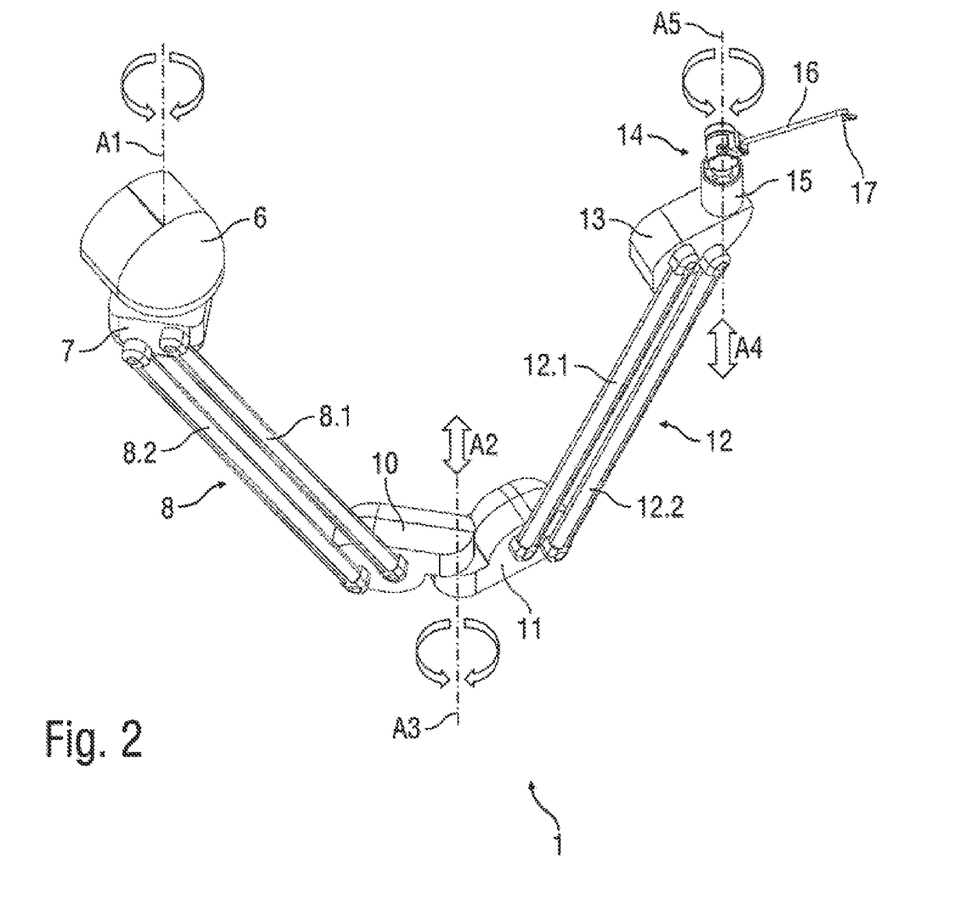
FIG. 2 shows a perspective view of the manipulating robot of FIG. 1 in another robot position.
Figure 3:
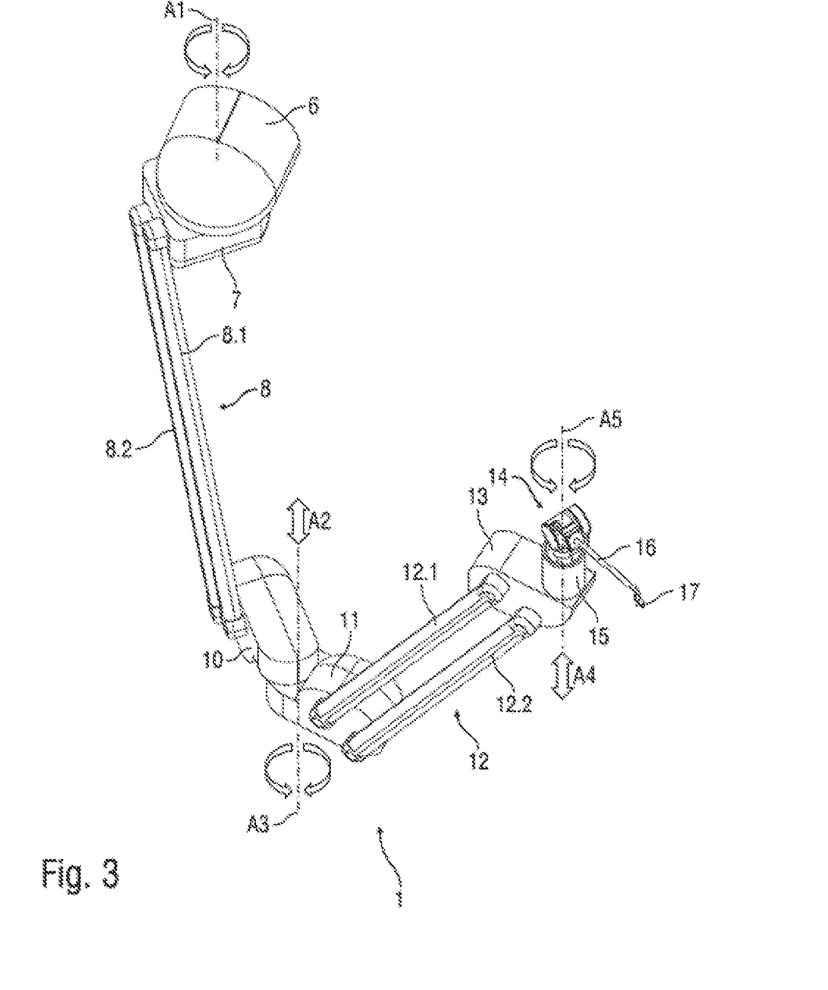
FIG. 3 shows a perspective view of the manipulating robot of FIGS. 1 and 2 in another robot position.
Figure 4:
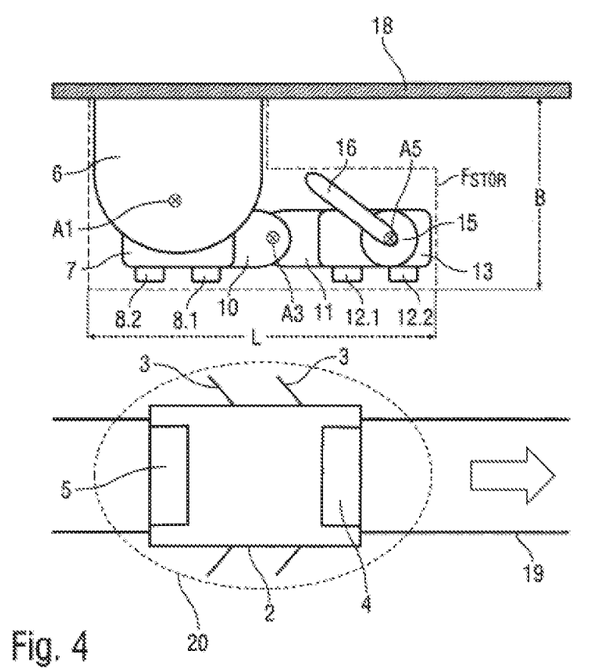
FIG. 4 shows a schematic plan view of a paint booth with the disclosed manipulating robot in the folded-together state.

Mounted on the robot element 13 is a manipulating tool 14 which is suitable for opening the doors 3, the trunk hood 5 and the engine hood 4 of the motor vehicle bodywork 2 (FIG. 4). The manipulating tool 14 substantially consists of a sixth robot element 15 which is rotatable relative to the robot element 13 about a rotation axis A5. The sixth robot element 15 has a pivot arm 16 for positioning a gripper 17. The construction and function of the manipulating tool 14 are per se known from the prior art and therefore need not be described in detail.

On a change of position of the manipulating robot 1, the manipulating tool 14 is repositioned in the space although the spatial orientation (angular position to the vertical) of the manipulating tool 14 is not influenced, which is achieved by means of the disclosed robot kinematics.

FIG. 4 shows a folded-together state of the manipulating robot 1. Therefrom, it is evident that, in the folded-together state, the manipulating robot 1 forms only a relatively small interference profile in the paint booth, wherein the paint booth is laterally delimited by a booth wall 18. The interference profile of the manipulating robot 1 herein extends in the horizontal direction over an interference area $F_{STÖR}$ that is smaller than 0.5 m$^2$. It should further be mentioned that, in the folded-together state of the manipulating robot 1, the interference profile extends transversely to the longitudinal direction of the paint booth only over a width B which is less than 0.5 m. Furthermore, in the folded-together state, the interference profile of the manipulating robot 1 also extends in the longitudinal direction of the paint booth only over a relatively small length L which is less than 1 m.

Firstly, the small interference profile of the manipulating robot 1 influences downwardly directed airstream in the paint booth only slightly.

Secondly, the small interference profile of the manipulating robot 1 in its folded-together state, represents a small hindrance for other robots (e.g. paint robots) in the paint booth.

FIG. 4 further shows that the motor vehicle bodywork 2 is conveyed through the paint booth by a conveyor 19 (shown only schematically) wherein the conveying direction is illustrated by a block arrow. In the drawing, an operating range 20 of the manipulating robot is shown dashed. This means that within the operating range 20, the manipulating robot 1 can open the doors 3, the trunk hood 5 and the engine hood 4. It is important herein that the reach of the manipulating robot 1 is large enough due to the disclosed robot kinematics so that the manipulating robot 1 can open the doors 3, the engine hood 4 and the trunk hood 5 of the motor vehicle bodywork 2 without any repositioning of the positionally fixed manipulating robot 1 or of the motor vehicle bodywork 2 being necessary.

Figure 6A:
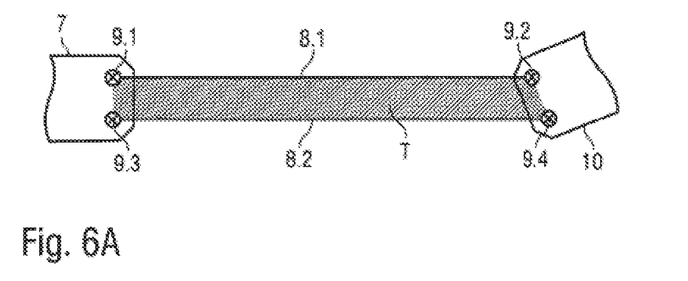
FIGS. 6A and 6B shows a derivation of FIGS. 5A and 5B, wherein the parallel kinematic system has the form of a trapezium.
Figure 6B:
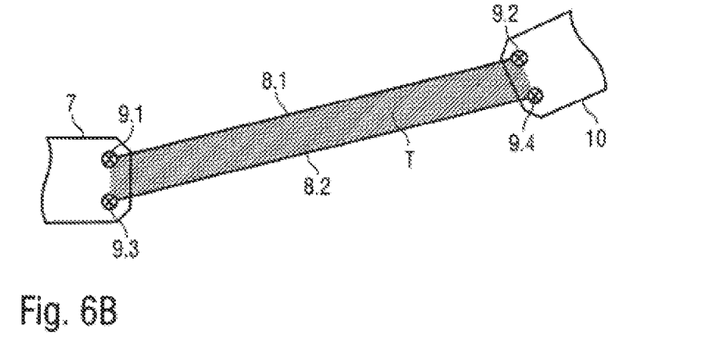

FIGS. 6A and 6B show a derivation of FIGS. 5A and 5B. However, this derivation corresponds largely to the above description, so that, for the avoidance of repetition, reference is made to the above description, wherein the same reference signs are used for corresponding details.

A peculiarity of this example lies therein that the rotation axes 9.1-9.4 of the rotation joints of the parallel kinematic system do not—as in FIGS. 5A and 5B—define a parallelogram P, but rather a trapezium T.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

REFERENCE SIGNS

1 Manipulating robot
2 Motor vehicle bodywork
3 Doors of the motor vehicle bodywork
4 Engine hood of the motor vehicle bodywork
5 Trunk hood of the motor vehicle bodywork
6 First robot element
7 Second robot element
8 First robot arm with parallel kinematic system
8.1-8.2 Arm parts of the first robot arm
9.1-9.4 Rotation axis of the rotation joints of the parallel kinematics
10 Third robot element
11 Fourth robot element
12 Second robot arm with parallel kinematics
12.1-12.2 Arm parts of the second robot arm
13 Fifth robot element
15 Sixth robot element
14 Manipulating tool
16 Pivotable arm of manipulating tool
17 Gripper of manipulating tool
18 Booth wall of paint booth
19 Conveyor
20 Operating range
A1-A5 Pivot axes
B Width of the interference profile of the manipulating robot in the folded-together state
$F_{STÖR}$ Horizontal interference area of the interference profile of the manipulating robot in the folded-together state
L Length of the interference profile of the manipulating robot in the folded-together state
P Parallelogram form of the parallel kinematics
T Trapezium form of the parallel kinematics

The invention claimed is:

1. A coating plant robot comprising:
a first robot element;
a second robot element rotatably attached to the first robot element about a vertical first element pivot axis;
a third robot element distal from the second robot element, the third robot element rotatably coupled to the second robot element by a first robot arm about a horizontal second element pivot axis, the first robot arm having two arm parts attached in parallel between the second and third robot elements, respectively, each of the two arm parts of the first robot arm being separately pivotally attached to each of the second and third robot elements at one of a plurality of first rotation joints oriented about one of a plurality of first joint axes, each of the plurality of first joint axes extending horizontally and parallel to each other, the first rotation joints at the second robot element spaced vertically and horizontally from each other, and the first rotation joints at the third element spaced vertically and horizontally from each other;
a fourth robot element pivotally attached to the third robot element about a vertical third element pivot axis;
a fifth robot element distal from the fourth robot element, the fifth robot element rotatably coupled to the fourth robot element by a second robot arm about a horizontal fourth element pivot axis, the second robot arm having two arm parts attached in parallel between the fourth and fifth robot elements, respectively, each of the two arm parts of the second robot arm being separately pivotally attached to each of the fourth and fifth robot elements at one of a plurality of second rotation joints oriented about one of a plurality of second joint axes, each of the plurality of second joint axes extending horizontally and parallel to each other; and
a sixth robot element which is pivotally attached to the fifth robot element about a vertical fifth element pivot axis;
wherein the third robot element maintains a first angular position relative to the vertical first element pivot axis, and the fifth robot element maintains a second angular position relative to the vertical third element pivot axis.

2. The coating plant robot according to claim 1, further comprising an end effector attached to the sixth robot element, the end effector being configured to open and close a motor vehicle bodywork component during a painting process.

3. The coating plant robot according to claim 2, wherein the first rotation joints of the two arm parts of the first robot arm are positioned at four corners of a parallelogram and the two arm parts overlap with two opposing sides of the parallelogram.

4. Coating plant robot according to claim 2, wherein the rotation axes of the four rotation joints of the two arm parts lie at the corners of a trapezoid.

5. The coating plant robot according to claim 2, wherein the first robot arm is arranged kinematically directly between the second and third robot elements, and the first robot arm holds the second and third robot elements in a constant angular relation to one another during a pivot movement.

6. The coating plant robot according to claim 2, wherein the first robot element is fixed.

7. The coating plant robot according to claim 2, wherein the end effector is a gripper tool.

8. The coating plant robot according to claim 2, wherein the coating plant robot has a load capacity of at least 1 kg.

9. The coating plant robot according to claim 8, wherein the coating plant robot has an operating range which extends in the horizontal direction over a width of at least 1 m.

10. The coating plant robot according to claim 9, wherein the coating plant robot has an operating range which extends in the horizontal direction over a length of at least 1 m.

11. The coating plant robot according to claim 10, wherein the coating plant robot has an operating range which extends in the vertical direction over a height of at least 1 m.

12. The coating plant robot according to claim 11, wherein the coating plant robot comprises at least five movable robot axes.

13. The coating plant robot according to claim 12, wherein the coating plant robot comprises not more than seven movable robot axes.

14. The coating plant robot according to claim 13, wherein the coating plant robot comprises at least one electrical axis drive for mechanically driving a robot axis.

15. The coating plant robot according to claim 2, wherein
- the coating plant robot is arranged at least partially in a paint booth,
- the coating plant robot is foldable together through the pivot connection between the third and fourth robot elements to define an interference profile, and
- the interference profile having area of less than 2 m².

16. The coating plant robot according to claim 15, wherein the interference profile has a length of less than 2 m.

17. The coating plant robot according to claim 16, wherein the interference profile has a width of less than 1 m.

* * * * *